US011888943B1

(12) United States Patent
Dingler Avilez

(10) Patent No.: US 11,888,943 B1
(45) Date of Patent: Jan. 30, 2024

(54) USE OF PRODUCTION TRAFFIC TO LOAD TEST A SERVICE

(71) Applicant: Amazon Technologies, Inc., Seattle, WA (US)

(72) Inventor: Fernando Francisco Dingler Avilez, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/112,580

(22) Filed: Dec. 4, 2020

(51) Int. Cl.
*G06F 15/173* (2006.01)
*H04L 67/51* (2022.01)
*H04L 43/18* (2022.01)
*H04L 43/067* (2022.01)
*H04L 43/026* (2022.01)

(52) U.S. Cl.
CPC ............ *H04L 67/51* (2022.05); *H04L 43/026* (2013.01); *H04L 43/067* (2013.01); *H04L 43/18* (2013.01)

(58) Field of Classification Search
CPC ..... H04L 67/16; H04L 67/10; H04L 67/1021; H04L 43/026; H04L 43/067; H04L 43/18; H04L 67/51
USPC .......................... 709/223–224; 718/105, 102
See application file for complete search history.

(56) References Cited

U.S. PATENT DOCUMENTS

| | | | |
|---|---|---|---|
| 6,397,072 B1 * | 5/2002 | Peters | H04W 4/02 455/456.3 |
| 9,082,018 B1 * | 7/2015 | Laska | H04L 67/10 |
| 9,571,516 B1 * | 2/2017 | Curcic | H04L 67/10 |
| 10,216,608 B1 * | 2/2019 | Arguelles | G06F 11/3612 |
| 2004/0039550 A1 * | 2/2004 | Myers | G06F 11/3414 714/E11.193 |
| 2004/0203900 A1 * | 10/2004 | Cedervall | H04L 67/52 455/457 |
| 2009/0287433 A1 * | 11/2009 | Houston | H04W 52/0258 702/62 |
| 2012/0030326 A1 * | 2/2012 | Cassidy | H04N 21/2143 709/223 |
| 2015/0372966 A1 * | 12/2015 | Seth | H04L 67/10 709/224 |
| 2016/0247126 A1 * | 8/2016 | Gehrke | G06Q 10/1095 |
| 2016/0342453 A1 * | 11/2016 | Khan | G06F 11/0793 |
| 2017/0118092 A1 * | 4/2017 | Dixon | H04L 43/04 |
| 2018/0123864 A1 * | 5/2018 | Tucker | H04L 41/065 |
| 2018/0357116 A1 * | 12/2018 | Settle | G06F 11/0781 |
| 2020/0004844 A1 * | 1/2020 | Hu | H04L 67/1021 |
| 2020/0320656 A1 * | 10/2020 | Eyler | G06Q 50/30 |
| 2021/0192612 A1 * | 6/2021 | Fisher | G06Q 40/025 |
| 2021/0227048 A1 * | 7/2021 | Raman | H04L 67/42 |

* cited by examiner

*Primary Examiner* — Bharat Barot
(74) *Attorney, Agent, or Firm* — BakerHostetler

(57) ABSTRACT

Implementations for providing load testing services that access logs as a basis for generating simulated traffic patterns are described. The access logs may be used to generate a pattern of events. The pattern of events may indicate a number of occurrences of an event at various times in a time period. The events may be distributed to geographically dispersed computing nodes to cause simulation of requests from different geographic locations using the pattern of events.

20 Claims, 7 Drawing Sheets

US 11,888,943 B1

USE OF PRODUCTION TRAFFIC TO LOAD TEST A SERVICE

BACKGROUND

In software engineering, load testing is the practice of generating traffic against an application simulating real-world load patterns. This practice is an important approach to finding bottlenecks of a system by studying the system's behavior under stress. However, existing load testing systems generate fake load patterns that do not mimic accurately what real production traffic looks like.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Disclosed herein are processes for load testing an application, such as by using prior traffic logs to simulate access patterns to an application. The disclosed techniques may include a method for capturing real-world traffic from VPC flow logs, Load Balancers, and/or API Gateways. The traffic from these logs may be reproduced by using a distributed load testing engine to mimic or re-play requests that happened to a system in the past. Theses techniques provide for improvements over conventional load testing, which uses generic algorithms, by allowing traffic reproduction in an efficient manner. The disclosed techniques allow for the replication of an issue that happened in production that may be difficult or impossible to replicate with existing tooling.

The disclosed techniques may include collecting access logs associated with ingress points of an application, such as load balancers, application programming interface (API) gateways, and/or the like. The access logs may be used to generate a timeline that represents what requests happened at what particular times for a given window of time. Once the timeline is constructed, the original traffic can be mimicked in a distributed fashion by leveraging computing nodes located in multiple regions worldwide to more accurately send traffic from different geographic locations.

Figure 1:
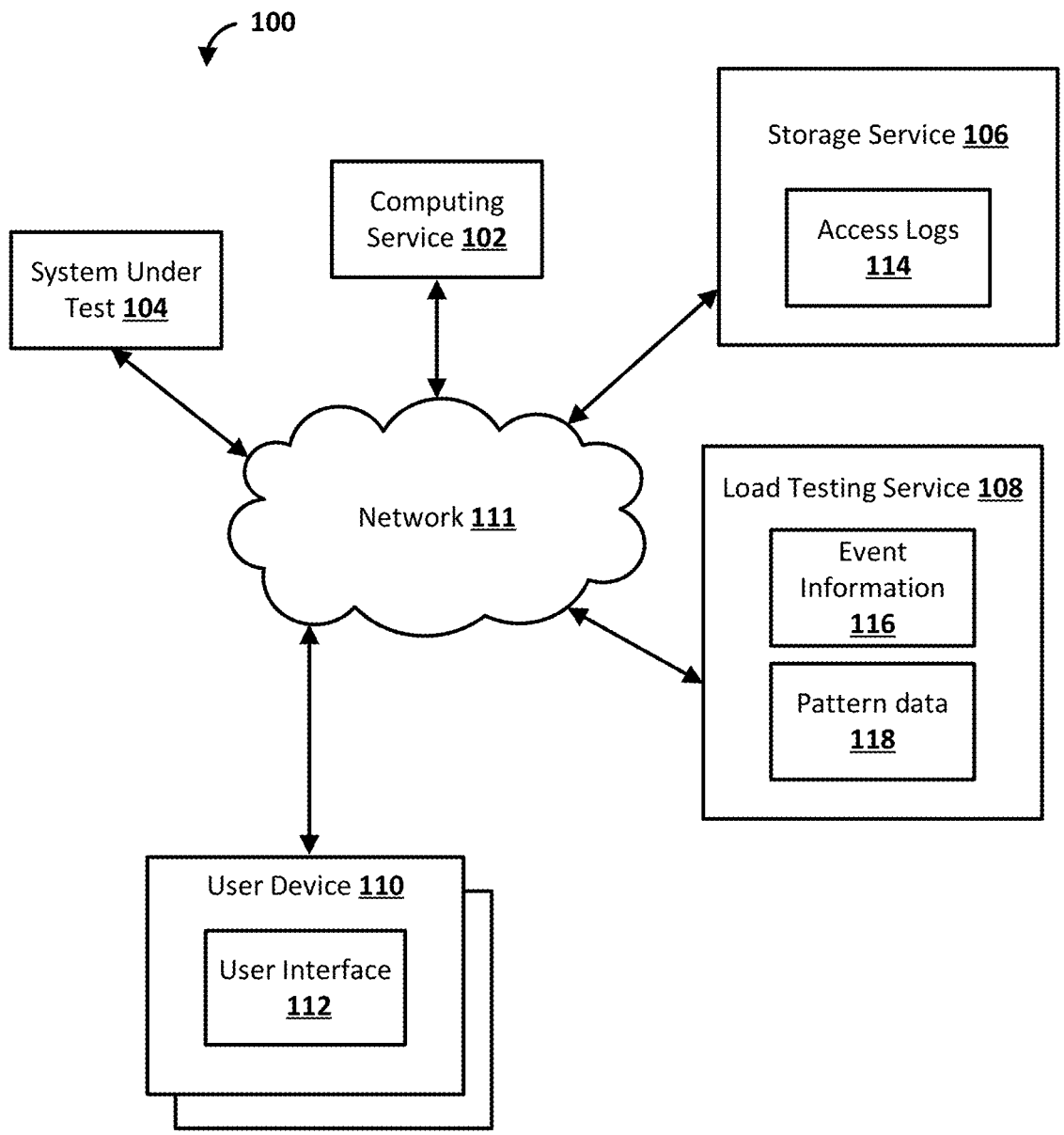
FIG. 1 is a diagram illustrating an example computing system for implementing a load testing service.

FIG. 1 is a diagram illustrating an example computing system 100 for providing one or more services. The one or more services may comprise a computing service 102, a system under test 104 (e.g., N application under test, an application service, an application end point), a storage service 106, a load testing service 108, or a combination thereof. The computing service 102, the system under test 104, the load testing service 108, the storage service 106, or a combination thereof may be part of a services platform (e.g., or provider network), such as a web services platform. The services platform may provide network based services that are geographically dispersed (e.g., external to user premises). The services platform may provide the one or more services to one or more user devices 110.

The system 100 comprises a network 111. The network 111 is configured to communicatively couple one or more of the services platform, the computing service 102, the system under test 104, the storage service 106, the load testing service 108, the user device 110, and/or the like. The network 111 may also comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 comprise a computing device, such as a mobile device, a smart device (e.g., smart watch, smart glasses, smart phone), a computing station, a laptop, a workstation, a tablet device, and/or the like. In embodiments, the one or more user devices 110 are configured to output one or more user interfaces 112, such as a user interface associated with the computing service 102, a user interface associated with the system under test 104, a user interface associated with the load testing service 108, or a user interface associated with the storage service 106, and/or the like. The one or more user interfaces are output by an application, such as desktop application, a mobile application, a browser application, a content browser, a web browser, and/or the like.

The computing service 102 is configured to provide one or more computing nodes, such as computer processors, virtual machines, computing devices, and/or the like. The computing service 102 may be used to implement a variety of services for the services platform, such as a web hosting service, database service, cloud computing services, analytic services, blockchain services, application programming interface services, developer services, machine learning services, security services, serverless hosting, business application services, gaming services, content services, and/or the like. The system under test 104, the storage service 106, and/or the load testing service 108 may use the one or more computing nodes of the computing service 102 to implement services.

The system under test 104 is configured to provide services to implement an application, such as a web based application, an HTTP based application, and/or the like. The system under test 104 may be configured to receive requests to access resources associated with the application from the user device 110. The system under test 104 may be configured to process the requests to provide access to the application. The application service 104 may comprise one or more load balancers, gateways (e.g., application programming interface (API) gateways), and/or the like that receive the requests.

In embodiments, the system under test 104 is configured store a history of events (e.g., requests, and other events) in access logs 114. The access logs 114 may be stored, accessed, and/or the like via the storage service 106. The data for the access logs 114 may be sent via the network 111 to the storage service 106. The access logs 114 may comprise an entry for each request received. The entry may comprise a client network address, a client identifier, a timestamp, a protocol method (e.g., GET, POST), a resource requested (e.g., "/user"), a server status code, a size of the response.

The load testing service 108 is configured to allow one or more users to load test an application, such as the application of the system under test 104. The load testing service 108 may be configured to generate event information 116 (e.g., or request information) based on the access logs 114. The event information 116 may comprise a file, catalogue, list, and/or set of event types determined based on entries in the access logs 114. Each of the event types may be non-redundant with the other event types. The load testing service 108 may receive an indication of a time frame by a user. The load testing service 108 may select data from the access logs 114 only within the time frame. The resulting data may be processed to generate the event information 116 by creating event types and comparing each new event to the event types (e.g., creating new event types if there is not a match).

A request type may be identified in the request information using a request type identifier. The request type identifier may be associated with one or more requests characteristics. The one or more request characteristics may comprise one or more of a protocol, a method associated with the protocol, a resource location associated with the protocol, a query parameter, or a data value.

The load testing service 108 may be configured to generate (e.g., store, determine, access) pattern data 118 indicative of a pattern of events (e.g., or requests). The pattern data 118 may comprise a timeline or other data structure indicating an ordering of event times. The pattern data 118 may be generated (e.g., stored) based the resulting data selected from the access logs 114. The pattern data 118 may associate event times with corresponding event characteristics. The event type identifiers may be used to reference the event information 116, which may store the event characteristics. The event characteristics may comprise one or more of a protocol, a method associated with the protocol, a resource location associated with the protocol, a query parameter, or a data value.

The event times may be organized in sequential order (e.g., in sequential time order) in the pattern of events. One or more of the event times may be associated with a corresponding event type, a count of events of the event type that are associated with the event time, and/or the like. One or more of the event times may be associated with event types based on an event type identifier. The event type identifier may be stored in the event information 116. The data indicative of the pattern of events may associate the request type identifier with corresponding counts of events for an event time.

The load testing service 108 may be configured to assign a plurality of events to one or more corresponding computing nodes of the computing service 102. The plurality of events may be assigned to the one or more corresponding computing nodes based on the pattern data 118. In embodiments, at least one of the one or more computing nodes is assigned to an event based on a location of the at least one computing node matching an event location of the event. The load testing service 108 may control a master computing node to access the pattern data 118 to assign the plurality of events. The master computing node may sequentially read each time entry in the pattern data 118 to determine any associated event types, event counts, and/or event locations. If an event type has X number of associated counts for a particular event time, X number of requests of that event time may be assigned to one or more of the plurality of computing nodes.

The one or more computing nodes of the computing service 102 may send messages indicative of the pattern of events. The messages may be based on the event characteristics. Sending the messages indicative of the pattern of events may comprise sending, based on a resource location of the event characteristics, the messages to a computing service associated with the resource location.

The one or more computing nodes may generate the messages indicative of the pattern of events. The one or more computing nodes may use the event type identifier to obtain the corresponding event characteristics. The resource location, protocol, protocol method, and/or other details may be used to generate a properly formatted message to a resource location managed by the computing service. In some scenarios, the access logs 114 used to generate the data indicative of the pattern of events may be based on data for a first service (e.g., a first application, first system under test) but used to generate messages for a second service. The second service (e.g., second application, second system under test) may be an updated version of the first service, a replacement to the first service, or a completely different service (e.g., associated with a different user of the provider network).

Placeholder data may be generated. The placeholder data may represent data originally associated with the events in the one or more access logs. One or more of the messages may comprise the placeholder data. In some scenarios, one or more scaling factors to modify the pattern of events may be determined (e.g., based on user input). The one or more scaling factors may be applied to the pattern of events prior to sending the messages. The access logs 114 may comprise access logs of requests received by one or more of a load balancer or an application programming interface (API) gateway. The messages may be sent to an updated version of one or more of the load balancer or API gateway.

The loading testing service 108 may access results of sending the messages. The system under test 104 may receive the messages. The system under test 104 may send event data to be stored in the access logs 114 based on processing the messages. The loading testing service 108 may access the added event data to the access logs 114. The load testing service 108 may output a report, metrics, and/or other information indicative of a time period associated with sending and/or processing the messages.

Figure 2A:
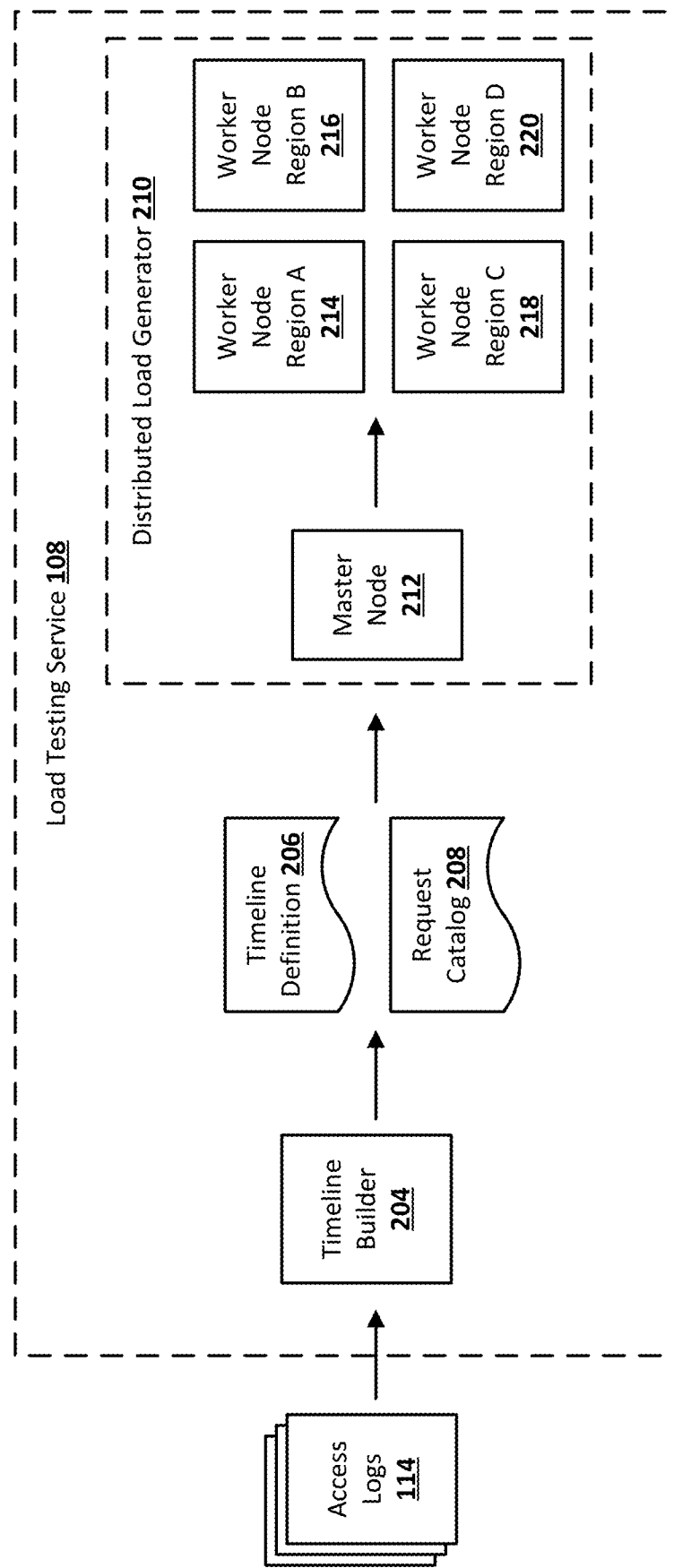
FIG. 2A is a process diagram showing an example process for events.

FIG. 2A is a diagram showing an example process for simulating events. The access log 114 may be collected for one or more services, such as a web application. Example access logs 114 may be collected from web server technologies like load balancers, API gateways, web servers (e.g., Apache, Nginx), and/or the like. The access logs 114 may be in the Common Log Format standard. For example, the access logs 114 may comprise any of the following information about a request: client IP Address, client identifier as in RFC 1413 spec, timestamp, HTTP method, resource requested (e.g., "/users"), HTTP status code of the server response, size of the response in bytes. The access logs 114 may not include for each request a request body or HTTP Headers. The access logs 114 may be accessed by the load testing service 108.

In embodiments, a timeline builder 204 (e.g., of the load testing service 108) is configured to process the access logs 114. The timeline builder 204 may receive data indicating a specified window of time as input and determine (e.g., generate, store) a timeline definition 206 and/or a request catalog 208 as output. The timeline definition 206 may comprise an indication of requests to be re-played in a format that is efficiently ordered to be read by a distributed load generator 210. A request catalog 208 may comprise a list of all requests that are captured in the access logs grouped by request type to avoid duplication and to allow requests to be customized before re-playing them.

A distributed load generator 210 (e.g., comprised in or directed by the load testing service 108) may be configured to process (e.g., read, analyze) the timeline definition 206 and re-plays the traffic against a desired system (e.g., or application) under test. This load generator may comprise a master node 212 and a plurality of worker nodes 214, 216, 218, 220 distributed across multiple geographic locations. The master node 212 is configured to process the timeline definition 206 and assign work to the plurality of worker nodes 214, 216, 218, 220.

Figure 2B:
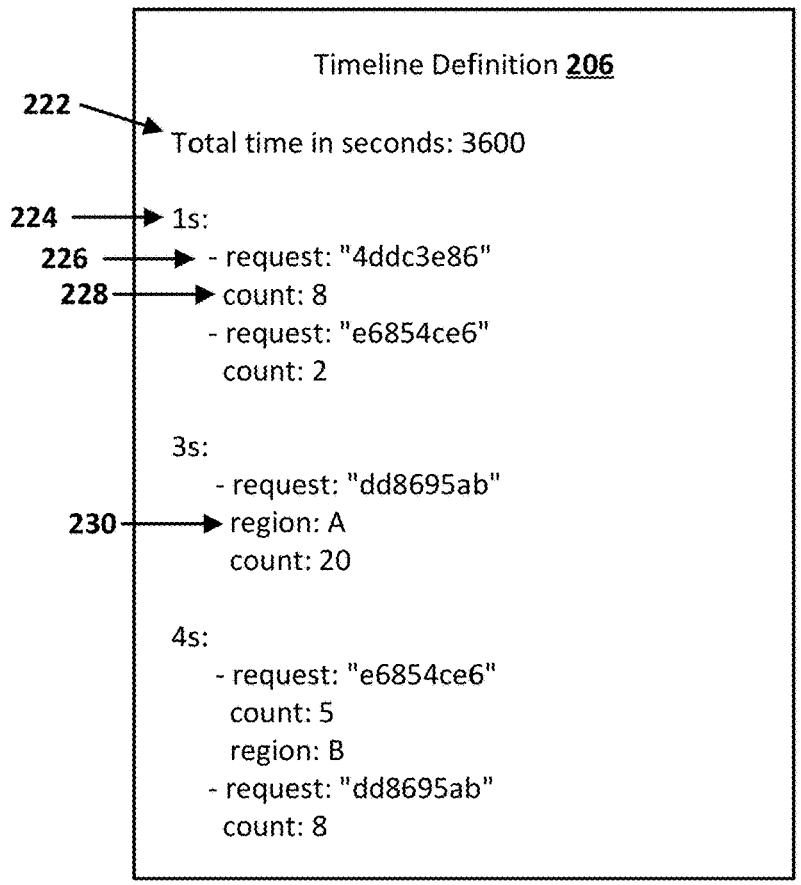
FIG. 2B is a diagram of an example timeline or pattern of events.

FIG. 2B is a diagram showing an example timeline definition 206. The timeline definition 206 may comprise a total time field 222. The total time field 222 may have a corresponding value indicating a total amount (e.g., in seconds) of time of the duration of the timeline specified in the timeline definition 206. The timeline definition 206 may comprise a plurality of time entries 224. Each time entry may indicate a time of the timeline. For example, each second of the total amount of time may be indicated (e.g., starting at 1 second) with a corresponding entry in the timeline definition 206.

One or more of the time entries 224 may comprise an indication of one or more requests. A request may be indicated by a request field 226. A request field 226 may have a value indicating an identifier of a request. The identifier of the request may correspond to a request type 232 in the request catalog 208. The request field 226 may be associated with a count field 228. The count 228 may indicate a number of times to perform the associated request at the specified time. In some scenarios, not every second in the window of time may appear in the timeline. If there are no requests at a given second, then it may be skipped from the timeline.

The timeline definition 206 may comprise a region field 230. The region field 230 may indicate a region (e.g., geographic region, or other location) associated with a particular request. The region may be determined based on a network address, such as an internet protocol address. The network address may be associated with a service provider, a region, a location, and/or the like. The region may be determined by performing a lookup of the IP address. The lookup may indicate a zip code, city, stage, and/or other location information that may be correlated to a region associated with one or more computing nodes. The region field 230 may be based on a location associated with the original request in the access logs 114. The region field 230 may used by the master node 212 to determine which of the plurality of worker nodes 214, 216, 218, and 220 to assign to the corresponding request. For example, if the region field 230 has a value of "A," then any corresponding requests may be assigned to the worker node 214 associated with region A. If no region field 230 is associated with a request, then the master node 212 may assign the request to any of the plurality of worker nodes 214, 216, 218, and 220.

Figure 2C:
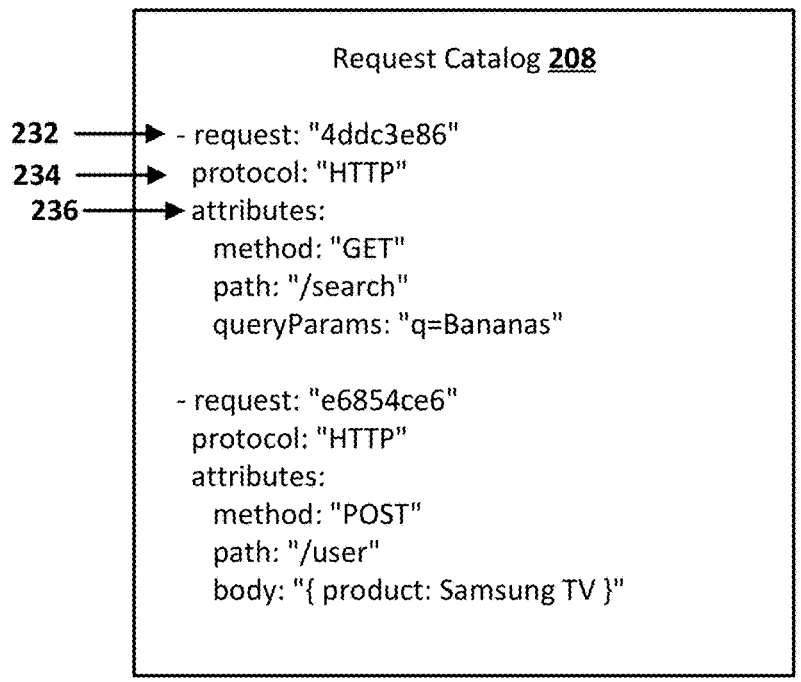
FIG. 2C is a diagram of example event information.

FIG. 2C is a diagram showing an example request catalog 208. The request catalog 208 may comprise a plurality of request types 232 (e.g., or event types, event definitions, request definitions). A request type 232 may have one or more associated characteristics, such as a protocol, attributes associated with the protocol, functions, paths, query parameters, data, and/or the like. A protocol field 234 may specify a protocol to use for a particular request type 232. The protocol may comprise hypertext transfer protocol, or any other protocol. An attributes field 236 may specify attributes associated with the request type 232, such as a method (e.g., or function) to use, a path (e.g., resource location), one or more query parameters, a message body, and/or other data. The plurality of worker nodes 214, 216, 218, and 220 may be configured to construct a request based on the protocol field 234, the attributes field 236, a combination thereof to simulate traffic. For fields that are omitted from the logs, such as the body and headers of a request, the plurality of worker nodes 214, 216, 218, and 220 may be configured to use placeholder data to reconstruct a request.

Figure 3:
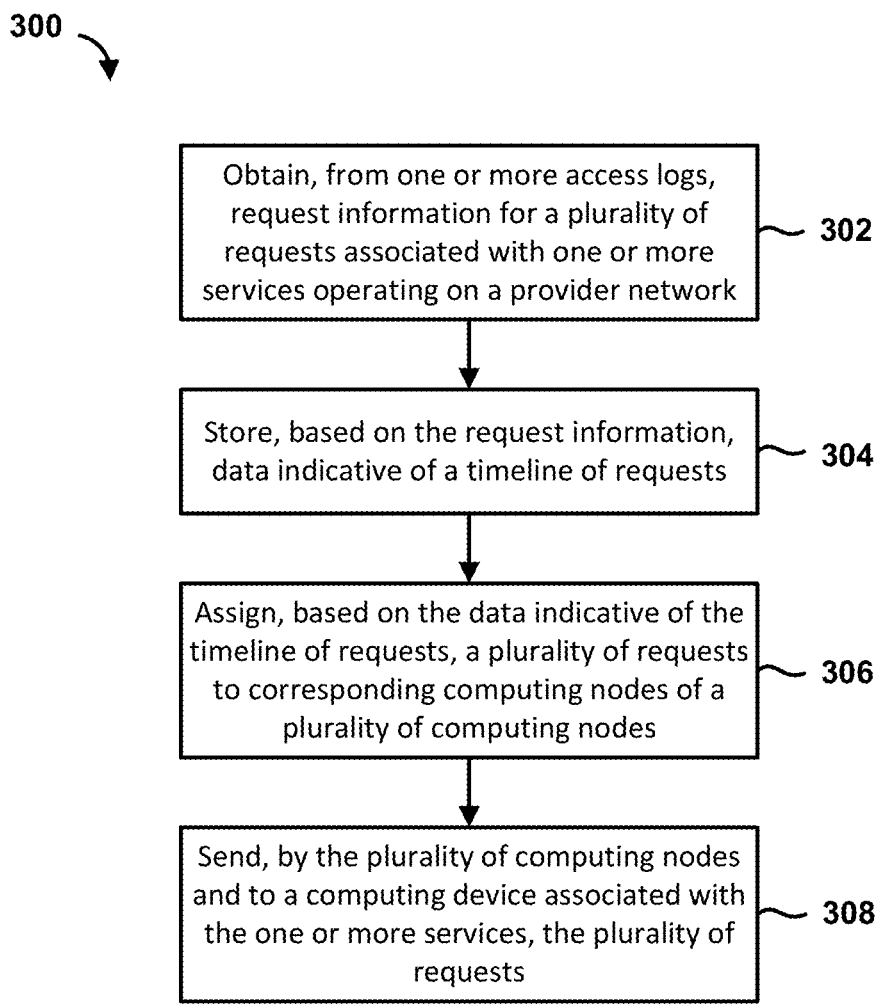
FIG. 3 is a flowchart showing an example process related to a load processing service.

FIG. 3 is a flowchart showing an example process 300 for use in connection with the disclosed methods. The process 300 may comprise a computer implemented process for simulating events (e.g., requests associated with a web application). A system and/or computing environment, such as the systems of FIGS. 1 and 2A, the computing environment of FIG. 5, and/or the computing system of FIG. 6 may be configured to perform the process 300.

Operation 302 depicts obtaining (e.g., retrieving, accessing, determining) request information for a plurality of requests associated with one or more services operating on a provider network. The request information may be obtained from one or more access logs. A time frame indicated by a user may be received. Obtaining the request information may be limited to the time frame. Obtaining the request information may be performed actively (e.g., by requesting) and/or passively (e.g., by receiving).

The method may comprise associating, based on the request information, a set of request types with one or more request characteristics. The request type may be from the set of request types. The request information may comprise a file, catalogue, list, and/or set of requests types determined based on data in the one or more access logs. Each of the request types may be non-redundant with the other request types. A request type may be identified (e.g., in the request information) using a request type identifier. The request type identifier may be associated with one or more requests characteristics. The one or more request characteristics may comprise one or more of a protocol, a method associated with the protocol, a resource location associated with the protocol, a query parameter, or a data value.

Operation 304 depicts storing (e.g., or determining, accessing, generating) data indicative of a timeline of requests. The data indicative of the timeline of requests may be stored based on the request information. The data indicative of the timeline of requests may associate (e.g., for each request in the timeline) a request type, a request time, and a request location. In embodiments, the data indicative of the timeline of requests may comprise a plurality of times organized in sequential order. One or more of the plurality of times may be associated with a corresponding request type (e.g., or a request type identifier), a count of requests of the request type that are associated with the time, or a combination thereof.

Operation 306 depicts assigning a plurality of requests to corresponding computing nodes of a plurality of computing nodes. The plurality of requests may be assigned based on the data indicative of the timeline of requests. At least one of the corresponding computing nodes may be assigned based on a location of the computing node matching a request location of the request. The plurality of computing nodes may comprise a plurality of geographically distributed computing nodes. A master computing node may access the data indicative of the timeline of requests to assign the plurality of requests. The master computing node may sequentially read each time entry in the timeline to determine any associated request types, request counts, and/or request locations. If a request type has X number of associated counts for a particular request time, X number of requests of that request time may be assigned to one or more of the plurality of computing nodes.

Operation 308 depicts sending the plurality of requests. The plurality of requests may be sent by the plurality of computing nodes. The plurality of requests may be sent to a computing device associated with the one or more services. The plurality of requests may have (e.g., based on the request information) the one or more request characteristics. The plurality of computing nodes may generate the plurality of requests. The plurality of computing nodes may use the request type identifier to obtain the corresponding request characteristics. The resource location, protocol, protocol method, and/or other details may be used to generate a properly formatted request to a resource location managed by the computing device associated with the one or more services. In some scenarios, the access logs used to generate the data indicative of the timeline may be based on data for a first service but used to generate tasks for a second service. The second service may be an updated version of the first service, a replacement to the first service, or a completely different service.

Figure 4:
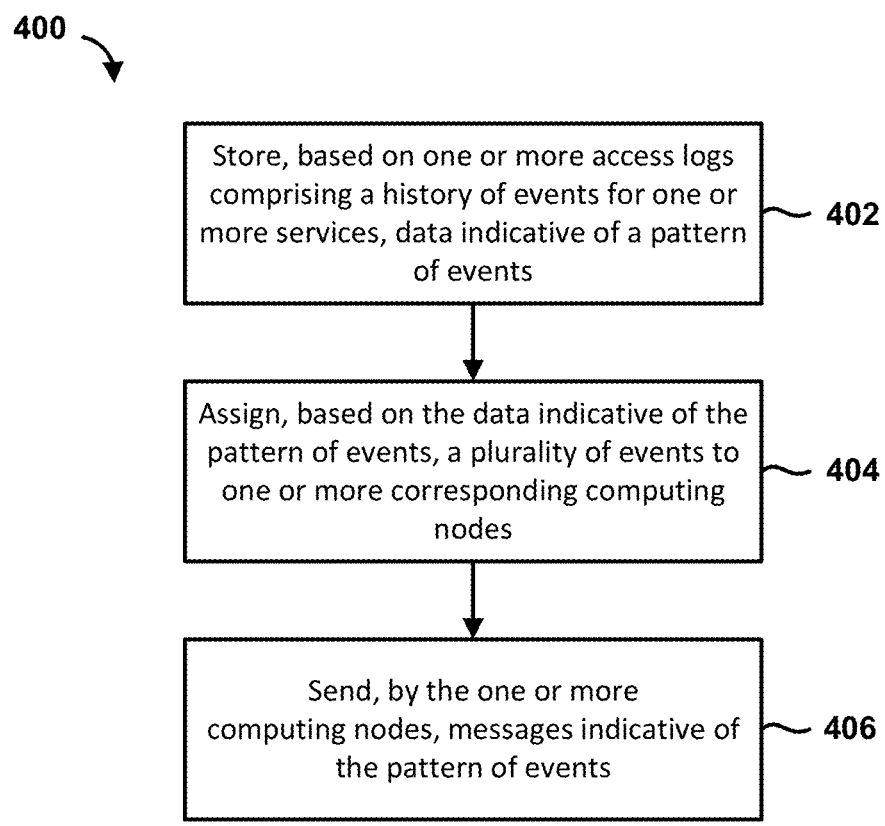
FIG. 4 is a flowchart showing an example process related to a load processing service.

FIG. 4 is a flowchart showing an example process 400 for use in connection with the disclosed methods. The process 400 may comprise a computer implemented process for simulating events (e.g., requests associated with a web application). A system and/or computing environment, such as the systems of FIGS. 1 and 2A, the computing environment of FIG. 5, and/or the computing system of FIG. 6 may be configured to perform the process 400.

Operation 402 depicts storing data indicative of a pattern of events. The data indicative of a pattern of events may be stored based on one or more access logs comprising a history of events for one or more services. Event data may be stored in the one or more access logs. The event data may comprise data associated with requests for a web services platform, a services platform, a provider network, an application, a service, or a combination thereof. A time frame indicated by a user may be received. The pattern of events and/or event data may be limited to events in the time frame.

The data indicative of the pattern of events may associate event times with corresponding event characteristics. The event times may be organized in sequential order in the pattern of events. One or more of the event times are associated with a corresponding event type and a count of events of the event type that are associated with the event time. One or more of the event times may be associated with event types based on an event identifier. The event identifier may be stored in event information (e.g., an event definition information, pattern definition information, a timeline definition). The event information may comprise a file, catalogue, list, and/or set of requests types determined based on the event data in the one or more access logs. Each of the event types may be non-redundant with the other event types. An event type may be identified (e.g., in the pattern of events, in the request information) using an event type identifier. The event type identifier may be associated with one or more event characteristics. The event characteristics may comprise one or more of a protocol, a method associated with the protocol, a resource location associated with the protocol, a query parameter, or a data value. The data indicative of the pattern of events may associate the request type identifier with corresponding counts of events for an event time.

Operation 404 depicts assigning a plurality of events to one or more corresponding computing nodes. The plurality of events may be assigned to the one or more corresponding computing nodes based on the data indicative of the pattern of events. In embodiments, at least one of the one or more computing nodes is assigned to an event based on a location of the at least one computing node matching an event location of the event. The one or more of computing nodes may comprise a plurality of geographically distributed computing nodes. A master computing node may access the data indicative of the pattern of events to assign the plurality of events. The master computing node may sequentially read each time entry in the pattern of events to determine any associated event types, event counts, and/or event locations. If an event type has X number of associated counts for a particular event time, X number of requests of that event time may be assigned to one or more of the plurality of computing nodes.

One or more (or each) time entry in the pattern of events may be read. For each time entry, an event type and a count of a number of events of the event type may be determined. The plurality of events may be assigned to the one or more corresponding computing nodes by assigning, for each time entry, a number of events of the event type indicated by the count of the number of events.

The plurality of events may be assigned to one or more corresponding computing nodes by using a master computing node to analyze the pattern of events and to assign, based on the pattern of events, the plurality of events to corresponding worker nodes in separate geographic regions based on locations of the worker computing nodes matching locations associated with events in the pattern of events.

Operation 406 depicts sending messages indicative of the pattern of events. The messages indicative of the pattern of events may be sent by the one or more computing nodes. The messages may be based on the event characteristics. Sending the messages indicative of the pattern of events may comprise sending, based on a resource location of the event characteristics, the messages to a computing service associated with the resource location.

The one or more computing nodes may generate the messages indicative of the pattern of events. The one or more computing nodes may use the event type identifier to obtain the corresponding event characteristics. The resource location, protocol, protocol method, and/or other details may be used to generate a properly formatted message to a resource location managed by the computing service. In some scenarios, the access logs used to generate the data indicative of the pattern of events may be based on data for a first service but used to generate messages for a second service. The second service may be an updated version of the first service, a replacement to the first service, or a completely different service.

Placeholder data may be generated. The placeholder data may represent data originally associated with the events in the one or more access logs. One or more of the messages may comprise the placeholder data. In some scenarios, one or more scaling factors to modify the pattern of events may be determined (e.g., based on user input). The one or more scaling factors may be applied to the pattern of events prior to sending the messages. The one or more access logs may comprise access logs of requests received by one or more of a load balancer or an application programming interface (API) gateway. The messages may be sent to an updated version of one or more of the load balancer or API gateway.

Figure 5:
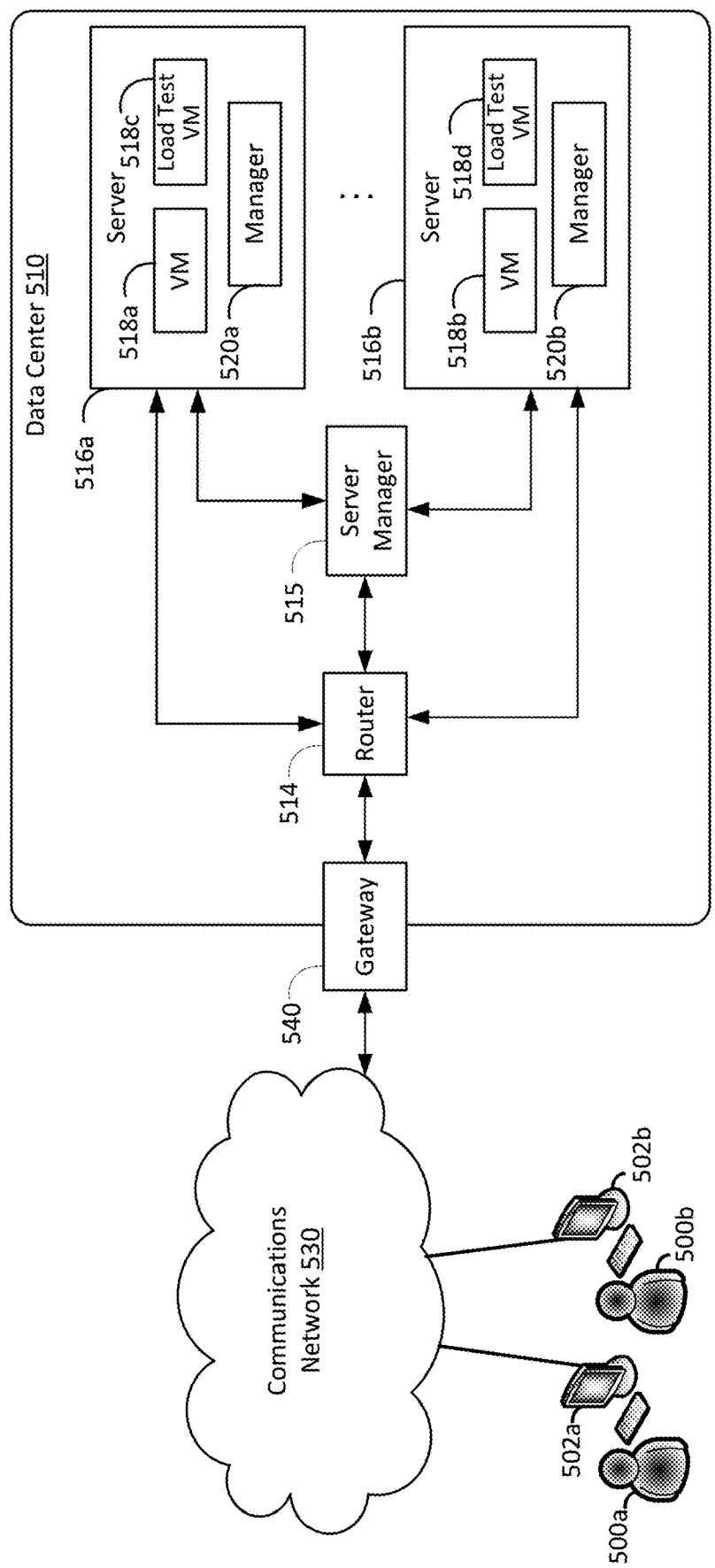
FIG. 5 is a diagram illustrating an example computing system that may be used in some embodiments.

FIG. 5 illustrates an example computing environment in which the embodiments described herein may be implemented. The example computing environment of FIG. 5 may be configured to implement one or more of the services platform, the computing service 102, the system under test 104, the, the storage service 106, the load testing service 108, or a combination thereof of FIG. 1. The example computing environment of FIG. 5 may be configured to implement the access logs 114, the timeline builder 204, the master node 212, the worker nodes 214, 216, 218, 220, or a combination thereof of FIG. 2A. The example computing environment of FIG. 5 may be configured to implement any of the methods described herein, such as any methods (e.g., or any operations) associated with FIGS. 1, 2A-C, 3, and 4.

FIG. 5 is a diagram schematically illustrating an example of a data center 510 that can provide computing resources to users 500a and 500b (which may be referred herein singularly as user 500 or in the plural as users 500) via user computers 502a and 502b (which may be referred herein singularly as computer 502 or in the plural as computers 502) via a communications network 530. Data center 510 may be configured to provide computing resources for executing applications on a permanent or an as-needed basis. The computing resources provided by data center 510 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 510 may include servers 516a-b (which may be referred herein singularly as server 516 or in the plural as servers 516) that provide computing resources. These resources may be available as bare metal resources, or as virtual machine instances 518a-d and (which may be referred herein singularly as virtual machine instance 518 or in the plural as virtual machine instances 518). Virtual machine instances 518c and 518d are load testing virtual machine instances. The load testing virtual machine instances 518c and 518d may be configured to perform all or any portion of the load testing techniques in accordance with the present disclosure and described in detail below. As should be appreciated, while the particular example illustrated in FIG. 5 includes one load testing virtual machine in each server, this is merely an example. A server may include more than one load testing virtual machine or may not include any load testing virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 5, communications network 530 may, for example, be a publicly accessible network of linked networks and possibly operated by various distinct parties, such as the Internet. In other embodiments, communications network 530 may be a private network, such as, a corporate or university network that is wholly or partially inaccessible to non-privileged users. In still other embodiments, communications network 530 may include one or more private networks with access to and/or from the Internet.

Communication network 530 may provide access to computers 502. User computers 502 may be computers utilized by users 500 or other customers of data center 510. For instance, user computer 502a or 502b may be a server, a desktop or laptop personal computer, a tablet computer, a wireless telephone, a personal digital assistant (PDA), an e-book reader, a game console, a set-top box or any other computing device capable of accessing data center 510. User computer 502a or 502b may connect directly to the Internet (e.g., via a cable modem or a Digital Subscriber Line (DSL)). Although only two user computers 502a and 502b are depicted, it should be appreciated that there may be multiple user computers.

User computers 502 may also be utilized to configure aspects of the computing resources provided by data center 510. In this regard, data center 510 might provide a gateway or web interface through which aspects of its operation may be configured through the use of a web browser application program executing on user computer 502. Alternately, a stand-alone application program executing on user computer 502 might access an application programming interface (API) exposed by data center 510 for performing the configuration operations. Other mechanisms for configuring the operation of various web services available at data center 510 might also be utilized.

Servers 516 shown in FIG. 5 may be standard servers configured appropriately for providing the computing resources described above and may provide computing resources for executing one or more web services and/or applications. In one embodiment, the computing resources may be virtual machine instances 518. In the example of virtual machine instances, each of the servers 516 may be configured to execute an instance manager 520a or 520b (which may be referred herein singularly as instance manager 520 or in the plural as instance managers 520) capable of executing the virtual machine instances 518. The instance managers 520 may be a virtual machine monitor (VMM) or another type of program configured to enable the execution of virtual machine instances 518 on server 516, for example. As discussed above, each of the virtual machine instances 518 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 510 shown in FIG. 5, a router 514 may be utilized to interconnect the servers 516a and 516b. Router 514 may also be connected to gateway 540, which is connected to communications network 530. Router 514 may be connected to one or more load balancers, and alone or in combination may manage communications within networks in data center 510, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 510 shown in FIG. 5, a server manager 515 is also employed to at least in part direct various communications to, from and/or between servers 516a and 516b. While FIG. 5 depicts router 514 positioned between gateway 540 and server manager 515, this is merely an exemplary configuration. In some cases, for example, server manager 515 may be positioned between gateway 540 and router 514. Server manager 515 may, in some cases, examine portions of incoming communications from user computers 502 to determine one or more appropriate servers 516 to receive and/or process the incoming communications. Server manager 515 may determine appropriate servers to receive and/or process the incoming communications based on factors such as an identity, location or other attributes associated with user computers 502, a nature of a task with which the communications are associated, a priority of a task with which the communications are associated, a duration of a task with which the communications are associated, a size and/or estimated resource usage of a task with which the communications are associated and many other factors. Server manager 515 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 510 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 6:
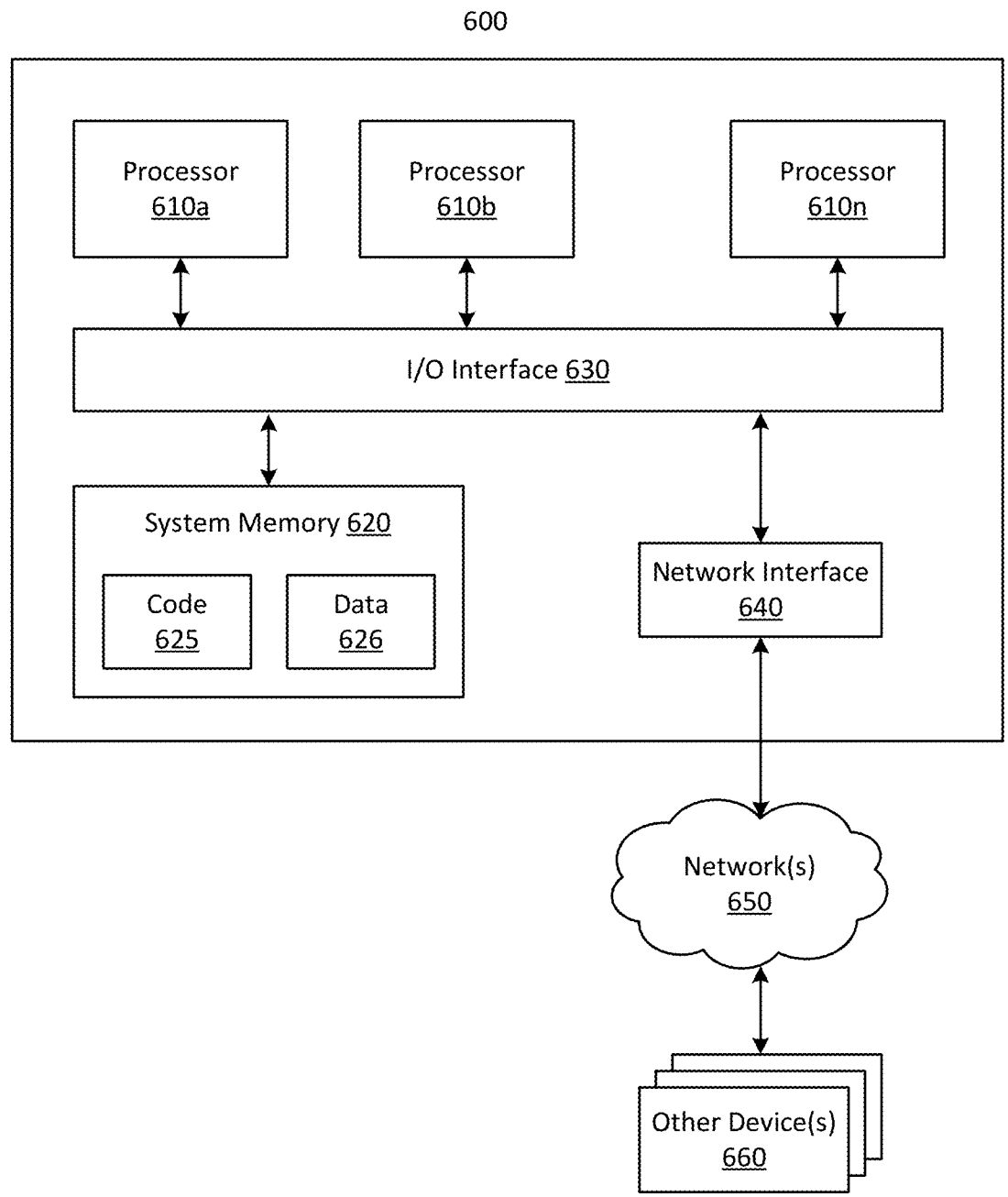
FIG. 6 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. The example computer system of FIG. 6 may be configured to implement one or more of the services platform, the computing service 102, the system under test 104, the, the storage service 106, the load testing service 108, or a combination thereof of FIG. 1. The example computer system of FIG. 6 may be configured to implement the access logs 114, the timeline builder 204, the master node 212, the worker nodes 214, 216, 218, 220, or a combination thereof of FIG. 2A. The example computer system of FIG. 6 may be configured to implement any of the methods described herein, such as any methods (e.g., or any operations) associated with FIGS. 1, 2A-C, 3, and 4.

In the illustrated embodiment, computing device 600 includes one or more processors 610a, 610b and/or 610n (which may be referred herein singularly as "a processor 610" or in the plural as "the processors 610") coupled to a system memory 620 via an input/output (I/O) interface 630. Computing device 6100 further includes a network interface 640 coupled to I/O interface 630.

In various embodiments, computing device 600 may be a uniprocessor system including one processor 610 or a multiprocessor system including several processors 610 (e.g., two, four, eight or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC or MIPS ISAs or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620 and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 600 via I/O interface 60. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 600 as system memory 60 or another type of memory. Further, a computer-accessible medium may include transmission media or signals such as electrical, electromagnetic or digital signals conveyed via a communication medium such as a network and/or a wireless link, such as those that may be implemented via network interface 60. Portions or all of multiple computing devices such as those illustrated in FIG. 5 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method, the method comprising:
   obtaining, from one or more access logs, request information for a plurality of requests associated with one or more services operating on a provider network;
   storing, based on the request information, data indicative of a timeline of requests, wherein the data indicative of the timeline of requests associates a request type, a request time, and a request location;
   assigning, using the data indicative of the timeline of requests, a plurality of requests to corresponding computing nodes of a plurality of computing nodes, wherein at least one of the corresponding computing nodes is assigned based on a location of the computing node matching a request location of the request; and
   causing, by a load testing service and based on the assigning of the plurality of requests to the corresponding computing nodes of the plurality of computing nodes, the plurality of computing nodes to send, to a computing device associated with the one or more services, the plurality of requests, wherein the plurality of requests have one or more request characteristics based on the request information.

2. The method of claim 1, wherein the data indicative of the timeline of requests comprises a plurality of times organized in sequential order, and wherein one or more of the plurality of times are associated with a corresponding request type and a count of requests of the request type that are associated with the time.

3. The method of claim 1, wherein the one or more request characteristics comprises one or more of a protocol, a method associated with the protocol, a resource location associated with the protocol, a query parameter, or a data value.

4. The method of claim 1, further comprising associating, based on the request information, a set of request types with one or more request characteristics, wherein the request type is from the set of request types.

5. The method of claim 1, further comprising receiving a time frame indicated by a user, wherein determining the request information is limited to the time frame.

6. A system comprising one or more memories having instructions thereon that, upon execution by one or more processors of the system, at least cause the system to:
   store, based on one or more access logs comprising a history of events for one or more services, data indicative of a pattern of events, wherein the data indicative of the pattern of events associates event times with corresponding event characteristics;
   assign, using the data indicative of the pattern of events, a plurality of events to one or more corresponding computing nodes; and
   cause, by a load testing service and based on the assigning of the plurality of events to the one or more corresponding computing nodes, the one or more computing nodes to send messages indicative of the pattern of events, wherein the messages are based on the event characteristics.

7. The system of claim 6, wherein the instructions, upon execution by one or more processors of the system, further cause the system to:
   read each time entry in the pattern of events; and
   determine, for each time entry, an event type and a count of a number of events of the event type,
   wherein the system is configured to assign the plurality of events to the one or more corresponding computing nodes by assigning, for each time entry, a number of events of the event type indicated by the count of the number of events.

8. The system of claim 7, wherein at least one of the one or more computing nodes are assigned to an event based on a location of the at least one computing node matching an event location of the event.

9. The system of claim 6, wherein the event times are organized in sequential order in the pattern of events, and wherein one or more of the event times are associated with a corresponding event type and a count of events of the event type that are associated with the event time.

10. The system of claim 6, wherein the event characteristics comprises one or more of a protocol, a method associated with the protocol, a resource location associated with the protocol, a query parameter, or a data value.

11. The system of claim 6, wherein the system is configured to send the messages indicative of the pattern of events by sending, based on a resource location of the event characteristics, the messages to a computing service associated with the resource location.

12. The system of claim 6, wherein the instructions, upon execution by one or more processors of the system, further cause the system to receive a time frame indicated by a user, wherein the pattern of events is limited to events in the time frame.

13. The system of claim 6, wherein the instructions, upon execution by one or more processors of the system, further cause the system to:
   determine one or more scaling factors to modify the pattern of events; and
   apply the one or more scaling factors to the pattern of events prior to sending the messages.

14. The system of claim 6, wherein the instructions, upon execution by one or more processors of the system, further cause the system to:
   generate placeholder data representing data originally associated with the events in the one or more access logs, wherein one or more of the messages comprise the placeholder data.

15. The system of claim 6, wherein the system is configured to assign the plurality of events to one or more corresponding computing nodes by using a master computing node to analyze the pattern of events and assigning, based on the pattern of events, the plurality of events to corresponding worker nodes in separate geographic regions based on locations of the worker computing nodes matching locations associated with events in the pattern of events.

16. A non-transitory computer-readable storage medium having stored thereon computer-readable instructions, the computer-readable instructions comprising instructions that, upon execution on one or more computing devices, at least cause:
- storing, based on access logs comprising a history of events for one or more services, data indicative of a pattern of events, wherein the data indicative of the pattern of events associates event times with corresponding event characteristics;
- assigning, using the data indicative of the pattern of events, a plurality of events to one or more corresponding computing nodes; and
- causing, by a load testing service and based on the assigning of the plurality of events to the one or more corresponding computing nodes, the one or more computing nodes to send messages indicative of the pattern of events, wherein the messages are based on the event characteristics.

17. The computer-readable storage medium of claim 16, wherein the instructions, upon execution on the one or more computing devices, further cause storing event data in the one or more access logs, wherein the event data comprises data associated with requests for a web services platform.

18. The computer-readable storage medium of claim 16, wherein at least one of the one or more computing nodes are assigned to an event based on a location of the at least one computing node matching an event location of the event.

19. The computer-readable storage medium of claim 16, wherein the event times are organized in sequential order in the pattern of events, and wherein one or more of the event times are associated with a corresponding event type and a count of events of the event type that are associated with the event time.

20. The computer-readable storage medium of claim 16, wherein the event characteristics comprise one or more of a protocol, a method associated with the protocol, a resource location associated with the protocol, a query parameter, or a data value.

* * * * *